United States Patent [19]

Mallinckrodt

[11] Patent Number: 5,073,900
[45] Date of Patent: Dec. 17, 1991

[54] INTEGRATED CELLULAR COMMUNICATIONS SYSTEM

[76] Inventor: Albert J. Mallinckrodt, 14141 Stratton Way, Santa Ana, Calif. 92705-3299

[21] Appl. No.: 495,497

[22] Filed: Mar. 19, 1990

[51] Int. Cl.[5] .......................................... H04L 27/30
[52] U.S. Cl. ........................................ 375/1; 370/18; 379/59; 455/33; 455/54
[58] Field of Search ...................... 370/18; 379/59, 60; 455/33, 53, 54

[56] References Cited

U.S. PATENT DOCUMENTS

| | | | |
|---|---|---|---|
| Re. 32,905 | 4/1989 | Baran | 370/104.1 |
| 4,189,677 | 2/1980 | Cooper et al. | 375/1 |
| 4,193,031 | 3/1980 | Cooper | 455/38 |
| 4,222,115 | 9/1980 | Cooper et al. | 375/1 |
| 4,313,197 | 1/1982 | Maxemchuk | 370/111 |
| 4,358,844 | 11/1982 | Pirani | 370/18 |
| 4,365,327 | 12/1982 | Pirani | 370/18 |
| 4,475,208 | 10/1984 | Ricketts | 375/1 |
| 4,587,661 | 5/1986 | Schiff | 375/1 |
| 4,644,560 | 2/1987 | Torre et al. | 375/1 |
| 4,672,655 | 6/1987 | Koch | 379/57 |
| 4,672,658 | 6/1987 | Kavehrad et al. | 379/63 |
| 4,700,374 | 10/1987 | Bini | 379/60 |
| 4,724,435 | 2/1988 | Moses et al. | 140/870.13 |
| 4,740,792 | 4/1988 | Sagey et al. | 342/457 |
| 4,761,796 | 8/1988 | Dunn et al. | 375/1 |
| 4,804,938 | 2/1989 | Rouse et al. | 340/310 A |
| 4,866,732 | 9/1989 | Carey et al. | 375/1 |
| 4,901,307 | 2/1990 | Gilhousen et al. | 375/1 |
| 4,972,456 | 11/1990 | Kaczmarek et al. | 379/59 |

*Primary Examiner*—Bernarr E. Gregory
*Attorney, Agent, or Firm*—Fulwider, Patton Lee & Utecht

[57] ABSTRACT

A cellular communications system is provided having both surface and satellite nodes which are fully integrated for providing service over large areas. A spread spectrum system is used with code division multiple access (CDMA) employing forward error correction coding (FECC) to enhance the effective gain and selectivity of the system. Multiple beam, relatively high gain antennas are disposed in the satellite nodes to establish the satellite cells, and by coupling the extra gain obtained with FECC to the high gain satellite node antennas, enough gain is created in the satellite part of the system such that a user need only use a small, mobile handset with a non-directional antenna for communications with both ground nodes and satellite nodes. User position information is also available. A digital data interleaving feature reduces fading.

20 Claims, 4 Drawing Sheets

INTEGRATED CELLULAR COMMUNICATIONS SYSTEM

BACKGROUND

The invention relates to communication systems and in particular, to a cellular mobile communications system having integrated satellite and ground nodes.

The cellular communications industry has grown at a fast pace in the United States and even faster in some other countries. It has become an important service of substantial utility and because of the growth rate, saturation of the existing service is of concern. High density regions having high use rates, such as Los Angeles, New York and Chicago are of most immediate concern. Contributing to this concern is the congestion of the electromagnetic frequency spectrum which is becoming increasingly severe as the communication needs of society expand. This congestion is caused not only by cellular communications systems but also by other communications systems. However, in the cellular communications industry alone, it is estimated that the number of mobile subscribers will increase on a world-wide level by an order of magnitude within the next ten years. The radio frequency spectrum is limited and in view of this increasing demand for its use, means to more efficiently use it are continually being explored.

Existing cellular radio is primarily aimed at providing mobile telephone service to automotive users in developed metropolitan areas. For remote area users, airborne users, and marine users, AIRFONE and INMARSAT services exist but coverage is incomplete and service is relatively expensive. Mobile radio satellite systems in an advanced planning stage will probably provide improved direct-broadcast voice channels to mobile subscribers in remote areas but still at significantly higher cost in comparison to existing ground cellular service. The ground cellular and planned satellite technologies complement one another in geographical coverage in that the ground cellular communications service provides voice telephone service in relatively developed urban and suburban areas but not in sparsely populated areas, while the planned earth orbiting satellites will serve the sparsely populated areas. Although the two technologies use the same general area of the RF spectrum, they are basically separate and incompatible by design as they presently exist. At present, if a user needs both forms of mobile communications coverage, he must invest in two relatively expensive subscriber units, one for each system.

The demand for mobile telephone service is steadily expanding and with the expansion of the service, the problem of serving an increased number of subscribers who are travelling from one region to another has become of primary importance. Cellular communications systems divide the service areas into geographical cells, each served by a base station or node typically located at its center. The central node transmits sufficient power to cover its cell area with adequate field strength. If a mobile user moves to a new cell, the radio link is switched to the new node provided there is an available channel. However, if the mobile user travels into a region where all channels are busy, or that is not served by any cellular service, or, in some cases, into an area served by a different licensee/provider, then his call may be abruptly terminated.

Present land mobile communication systems typically use a frequency modulation (FM) approach and because of the limited interference rejection capabilities of FM modulation, each radio channel may be used only once over a wide geographical area encompassing many cells. This means that each cell can use only a small fraction of the total allocated radio frequency band, resulting in an inefficient use of the available spectrum. In some cases, the quality of speech is poor because of the phenomena affecting FM transmission known as fading and "dead spots." The subjective effect of fading is repeated submersion of the voice signal in background noise frequently many times per second if the mobile unit is in motion. The problem is exacerbated by interference from co-channel users in distant cells and resultant crosstalk due to the limited interference rejection capability of FM. Additionally, communications privacy is relatively poor; the FM signal may be heard by others who are receiving that frequency.

In the case where one band of frequencies is preferable over others and that one band alone is to be used for mobile communications, efficient communications systems are necessary to assure that the number of users desiring to use the band can be accommodated. For example, there is presently widespread agreement on the choice of L-band as the technically preferred frequency band for the satellite-to-mobile link in mobile communications systems. In the case where this single band is chosen to contain all mobile communications users, improvements in spectral utilization in the area of interference protection and in the ability to function without imposing intolerable interference on other services will be of paramount importance in the considerations of optimal use of the scarce spectrum.

The spread spectrum communications technique is a technology that has found widespread use in military applications which must meet requirements for security, minimized likelihood of signal detection, and minimum susceptibility to external interference or jamming. In a spread spectrum system, the data modulated carrier signal is further modulated by a relatively wide-band, pseudo-random "spreading" signal so that the transmitted bandwidth is much greater than the bandwidth or rate of the information to be transmitted. Commonly the "spreading" signal is generated by a pseudo-random deterministic digital logic algorithm which is duplicated at the receiver.

By further modulating the received signal by the same spreading waveform, the received signal is remapped into the original information bandwidth to reproduce the desired signal. Because a receiver is responsive only to a signal that was spread using the same unique spreading code, a uniquely addressable channel is possible. Also, the power spectral density is low and without the unique spreading code, the signal is very difficult to detect, much less decode, so privacy is enhanced and interference with the signals of other services is reduced. The spread spectrum signal has strong immunity to multipath fading, interference from other users of the same system, and interference from other systems.

In a satellite communications system, downlink power is an important consideration. Satellite power is severely limited; therefore, the number of users of the satellite that can be accommodated, and consequently the economic viability of such a system, is in inverse proportion to how much satellite transmitter power must be allocated to each user. Many of the proposed mobile communications satellite systems have relied upon user antenna directivity to provide additional effective power gain. This has resulted in significant user equipment expense and the operational inconvenience of having to perform some steering or selection of the antenna to point at the satellite. Additionally, hand held transceivers are impractical because of the relatively large directive antennas required.

Thus it would be desirable to provide a cellular communications system which integrates satellite nodes with surface nodes to provide coverage of greater surface areas without requiring the use of two different systems with attendant expense and hardware requirements. Additionally, it would be desirable to provide a cellular communications system using a spread spectrum technique which can make more efficient use of existing frequency spectrum resources and result in increased privacy in communications. Additionally, it would be desirable to permit the use of a relatively low power, compact and mobile user handset having a small, non-directional antenna, one which can communicate with both the land-based stations and the satellite-based stations.

SUMMARY OF THE INVENTION

The invention provides a cellular communications system having both surface and space nodes which are fully integrated. Areas where surface nodes are impractical are covered by a space node. Space nodes comprise satellites which establish cells which in many cases overlap ground cells. A spread spectrum communications method is used which includes code division multiple access (CDMA) and forward error correction coding (FECC) techniques to increase the number of users that can be accommodated within the allocated spectrum. The spread spectrum system makes possible the use of very low rate, highly redundant coding without loss of capability to accommodate the largest possible number of users within the allocated bandwidth. The low rate coding in turn provides maximum possible coding gain, minimizing the required signal strength at the receiver.

Relatively high gain, multiple-beam antennas are used on the satellites and by coupling them with the extra gain obtained with FECC, enough gain exists in the system such that the user unit comprises only a small, mobile handset with a small, non-directional antenna.

A system network control center is used to coordinate system-wide operations, to keep track of user locations, to perform optimum allocation of system resources to each call, dispatch facility command codes, and monitor and supervise overall system health. This system network control center is itself of a hierarchical nature comprising a system network control center, regional node control centers which coordinate the detailed allocation of ground network resources within a region, and one or more satellite node control centers responsible for allocation of resources among the satellite network resources.

DETAILED DESCRIPTION OF THE PREFERRED EMBODIMENTS

As is shown in the exemplary drawings, the invention is embodied in a cellular communications system utilizing integrated satellite and ground nodes both of which use the same modulation, coding, and spreading structure and both responding to an identical user unit.

Figure 1:
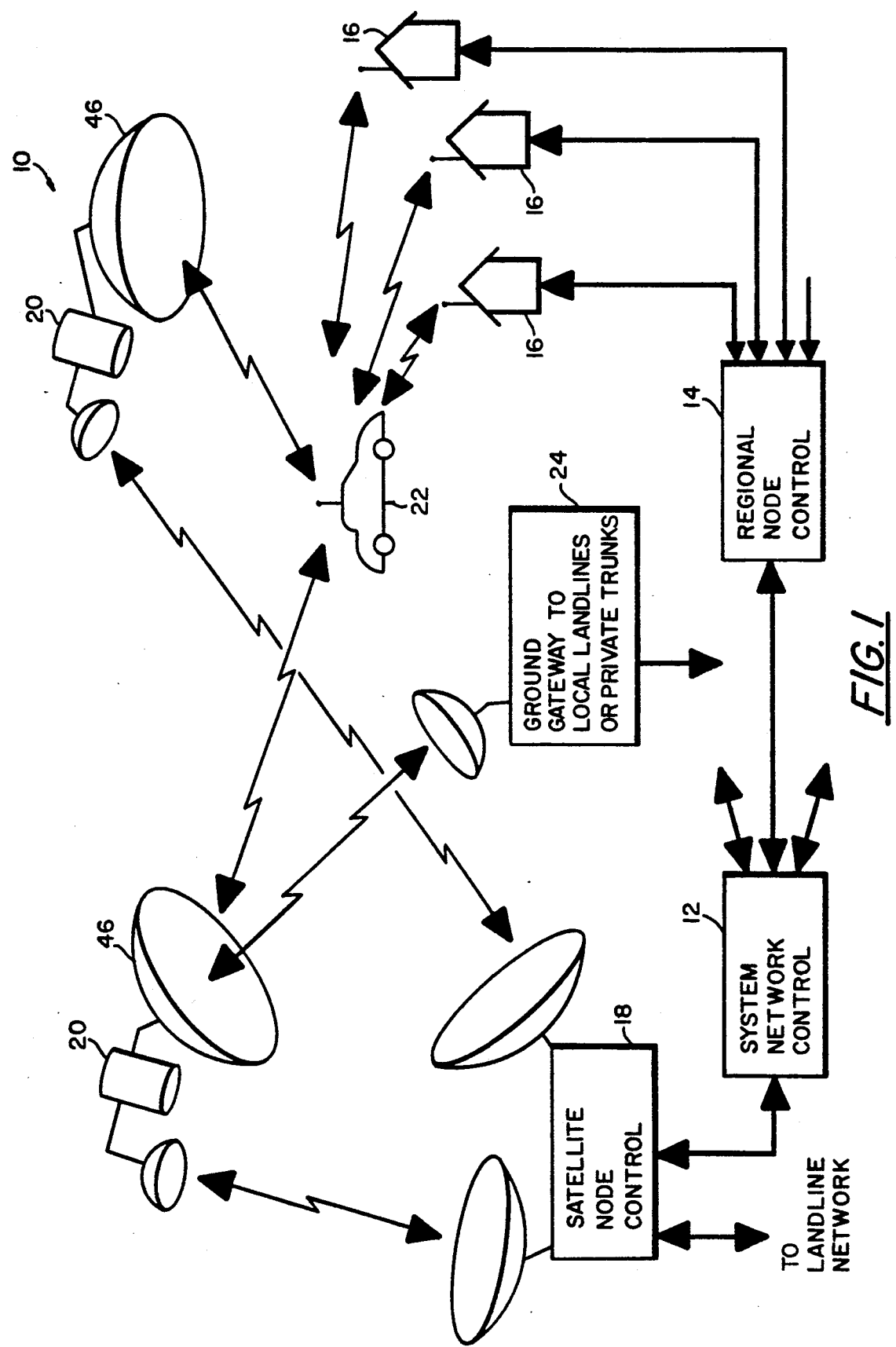
FIG. 1 is a block diagram showing an overview of the principal elements of a communications system in accordance with the principles of the invention.

Referring now to FIG. 1, an overview of a communications system 10 is presented showing the functional inter-relationships of the major elements. The system network control center 12 directs the top level allocation of calls to satellite and ground regional resources throughout the system. The regional node control centers 14, one of which is shown, direct the allocation of calls to ground nodes within a major metropolitan region. The ground nodes 16 under direction of the respective regional node control center 14 receive calls over the fixed landline network, encode them, spread them according to the unique spreading code assigned to each designated user, combine them into a composite signal, modulate that composite signal onto the transmission carrier, and broadcast them over the cellular region covered. Satellite node control centers 18 similarly handle calls designated for satellite links, encode them, spread them according to the unique spreading codes assigned to the designated users, and multiplex them with other similarly directed calls into an uplink trunk, which is beamed up to the designated satellite 20.

Satellite nodes 20 receive the uplink trunk, separate the calls intended for different satellite cells, direct each to its appropriate cell transmitter and cell beam, and broadcast the composite of all such similarly directed calls down to the intended satellite cellular area. User units 22 respond to signals of either satellite or ground node origin, receive any signal spread using the user's assigned unique spreading code, de-spread, de-modulate, and decode the information and deliver the call to the user. Gateways 24 provide direct trunks, that is, groups of channels, between satellite and the ground public switched telephone system or private trunk users.

All of the above-discussed centers, nodes, units and gateways are full duplex transmit/receive, performing the corresponding inbound (user to system) link functions as well in the inverse manner to the outbound (system to user) link functions just described.

Figure 2:
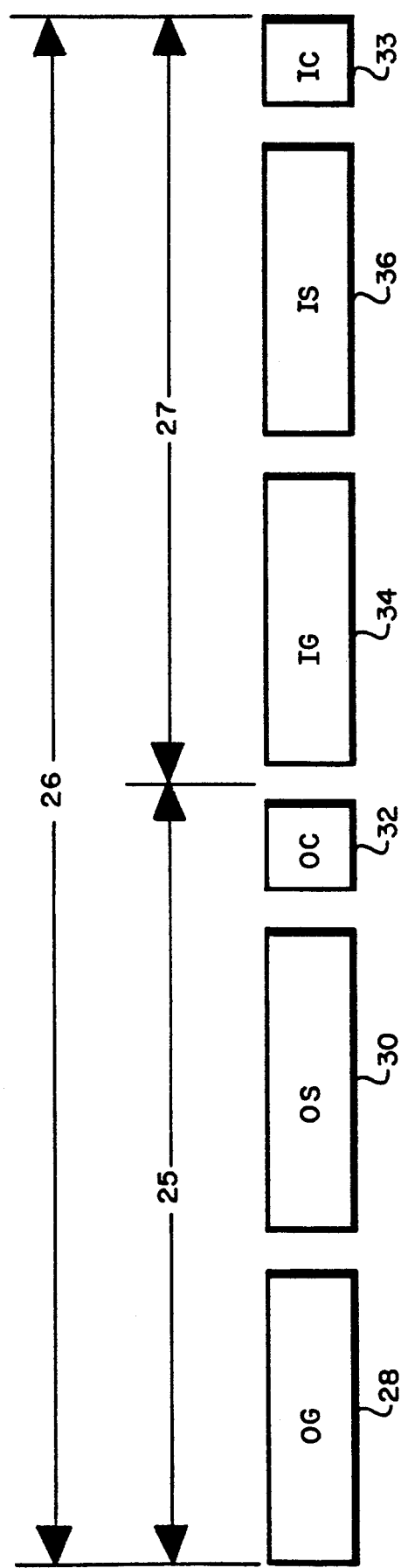
FIG. 2 is a diagram of the frequency sub-bands of the frequency band allocation for a cellular system.

Referring now to FIG. 2, the allocated frequency band 26 of a communications system is shown. The allocated frequency band 26 is divided into 2 main sub-bands, an outgoing sub-band 25 and an incoming sub-band 27. Additionally the main sub-bands are themselves divided into further sub-bands which are designated as follows:

OG: Outbound Ground 28 (ground node to user)
OS: Outbound Satellite 30 (satellite node to user)
OC: Outbound Calling and Command 32 (node to user)
IG: Inbound Ground 34 (user to ground node)
IS: Inbound Satellite 36 (user to satellite node)
IC: Inbound Calling and Tracking (user to node)

All users in all cells use the entire designated sub-band for the described function. Unlike existing ground or satellite mobile systems, there is no necessity for frequency division by cells; all cells may use these same basic six sub-bands. This arrangement results in a higher frequency reuse factor as is discussed in more detail below.

In one embodiment, a mobile user's unit 22 will send an occasional burst of an identification signal in the IC sub-band either in response to a poll or autonomously. This may occur when the unit 22 is in standby mode. This identification signal is tracked by the regional node control center 14 as long as the unit is within that respective region, otherwise the signal will be tracked by the satellite node or nodes. By this means, the applicable regional node control center 14 and the system network control center 12 remain constantly aware of the cellular location and link options for each active user 22. An intra-regional call to or from a mobile user 22 will generally be handled solely by the respective regional node control center 14. Inter-regional calls are assigned to satellite or ground regional system resources by the system network control center 12 based on the location of the parties to the call, signal quality on the various link options, resource availability and best utilization of resources.

A user 22 in standby mode constantly monitors the common outbound calling frequency sub-band OC 32 for calling signals addressed to him by means of his unique spreading code. Such calls may be originated from either ground or satellite nodes. Recognition of his unique call code initiates the user unit 22 ring function. When the user goes "off-hook", e.g. by lifting the handset from its cradle, a return signal is broadcast from the user unit 22 to any receiving node in the user calling frequency sub-band IC 38. This initiates a handshaking sequence between the calling node and the user unit which instructs the user unit whether to transition to either satellite, or ground frequency sub-bands, OS 30 and IS 36 or OG 28 and IG 34.

A mobile user wishing to place a call simply takes his unit 22 off hook and dials the number of the desired party. Thereby an incoming call sequence is initiated in the IC sub-band 38. This call is generally heard by several ground and satellite nodes which forward call and signal quality reports to the appropriate system network control center 12 which in turn designates the call handling to a particular satellite node 20 or regional node control center 14. The call handling element then initiates a handshaking function with the calling unit over the OC 32 and IC 38 sub-bands, leading finally to transition to the appropriate satellite or ground sub-bands for communication.

Figure 3:
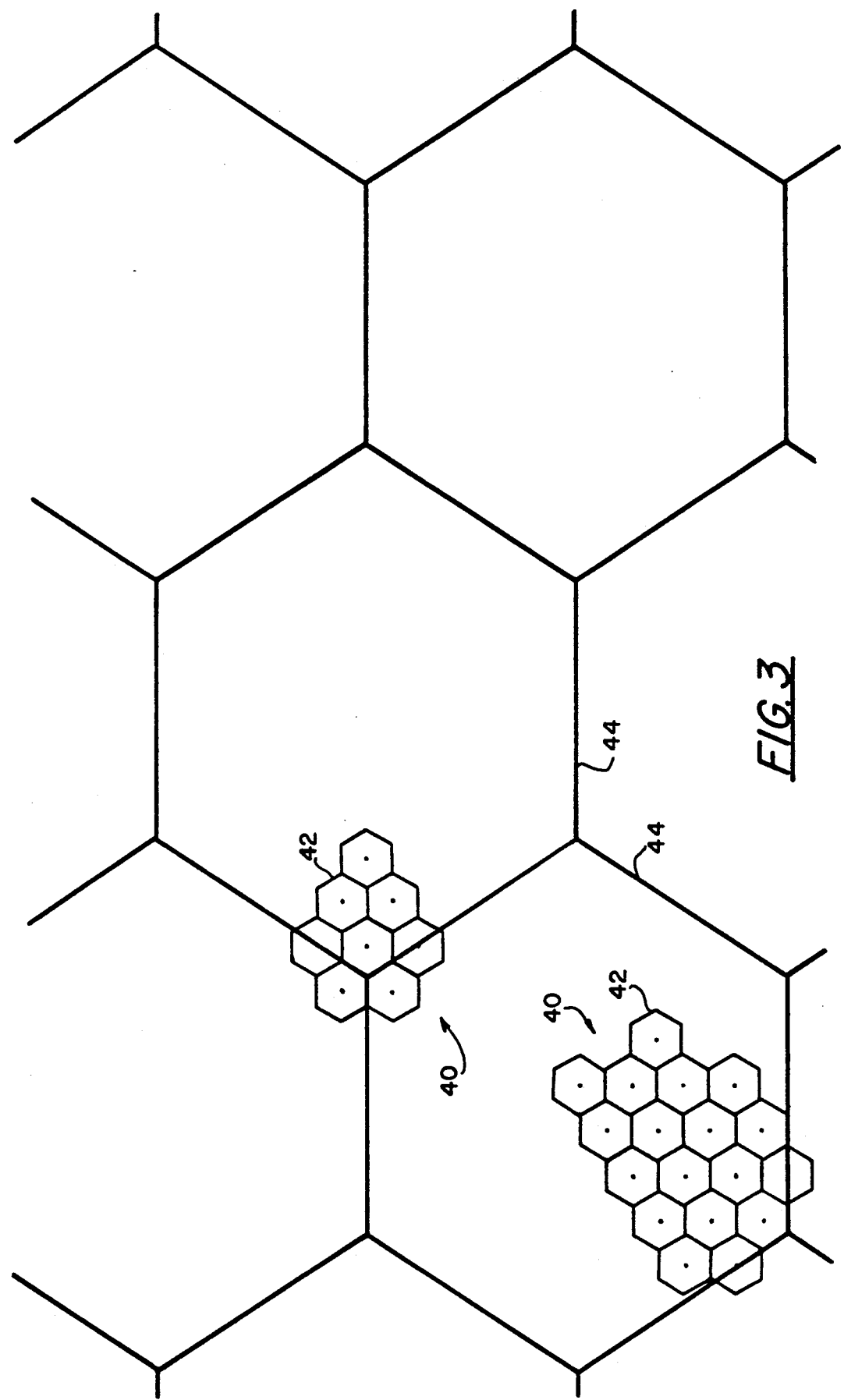
FIG. 3 is a diagram showing the interrelationship of the cellular hierarchical structure of the ground and satellite nodes in a typical section.

Referring now to FIG. 3, a hierarchical cellular structure is shown. A pair of clusters 40 of ground cells 42 are shown. Additionally, a plurality of satellite cells 44 are shown. Although numerals 42 and 44 point only to two cells each, this has been done to retain clarity in the drawing. Numeral 42 is meant to indicate all ground cells in the figure and similarly numeral 44 is meant to indicate all satellite cells. The cells are shown as hexagonal in shape, however, this is exemplary only. The ground cells may be from 3 to 15 km across although other sizes are possible depending on user density in the cell. The satellite cells may be approximately 400-500 km across an example. As shown, some satellite cells may include no ground cells. Such cells may cover undeveloped areas for which ground nodes are not practical.

A significant advantage of the invention is that by the use of spread spectrum multiple access, adjacent cells are not required to use different frequency bands. All ground-user links utilize the same two frequency sub-bands (OG 28, IG 34) and all satellite-user links use the same two frequency sub-bands (OS 30, IS 36). This obviates an otherwise complex and restrictive frequency coordination problem of ensuring that frequencies are not reused within cells closer than some minimum distance to one another (as in the FM approach), and yet provides for a hierarchical set of cell sizes to accommodate areas of significantly different subscriber densities.

Referring again to FIG. 1 as well as to FIG. 3, the satellite nodes 20 make use of large, multiple-feed (i.e., "multiple beam") antennas 46 which in one embodiment provide separate beams and associated separate transmitters for each satellite cell 44. For example, the multiple feed antenna 46 may cover an area such as the United States with, typically, about 100 satellite beams/cells. The combined satellite/ground nodes system provides a hierarchical geographical cellular structure. Thus within a dense metropolitan area, each satellite cell 44 may further contain as many as 100 or more ground cells 42, which ground cells would normally carry the bulk of the traffic originated therein. The number of users of the ground nodes 16 is anticipated to exceed the number of users of the satellite nodes 20 where ground cells exist within satellite cells. Because all of these ground node users would otherwise interfere as background noise with the intended user-satellite links, in one embodiment, the frequency band allocation may be separated into separate segments for the ground element and the space element as has been discussed in connection with FIG. 2. This combined, hybrid service can be provided in a manner that is smoothly transparent to the user. Calls will be allocated among all available ground and satellite resources in the most efficient manner by the system network control center 12.

An important parameter in most considerations of cellular radio communications systems is the "cluster", defined as the minimal set of cells such that mutual interference between cells reusing a given frequency sub-band is tolerable provided that such "co-channel cells" are in different clusters. Conversely all cells within a cluster must use different frequency sub-bands. The number of cells in such a cluster is called the "cluster size". It will be seen that the "frequency reuse factor", i.e. the number of possible reuses of a frequency sub-band within the system is thus equal to the number of cells in the system divided by the cluster size. The overall bandwidth efficiency of the system is thus inversely proportional to the cluster size. By means to be described, the invention system achieves a minimum possible cluster size of one as compared to typically 7 to 13 for other ground or satellite cellular concepts and thereby a maximum possible frequency reuse factor. This is a major advantage of the invention.

Figure 4:
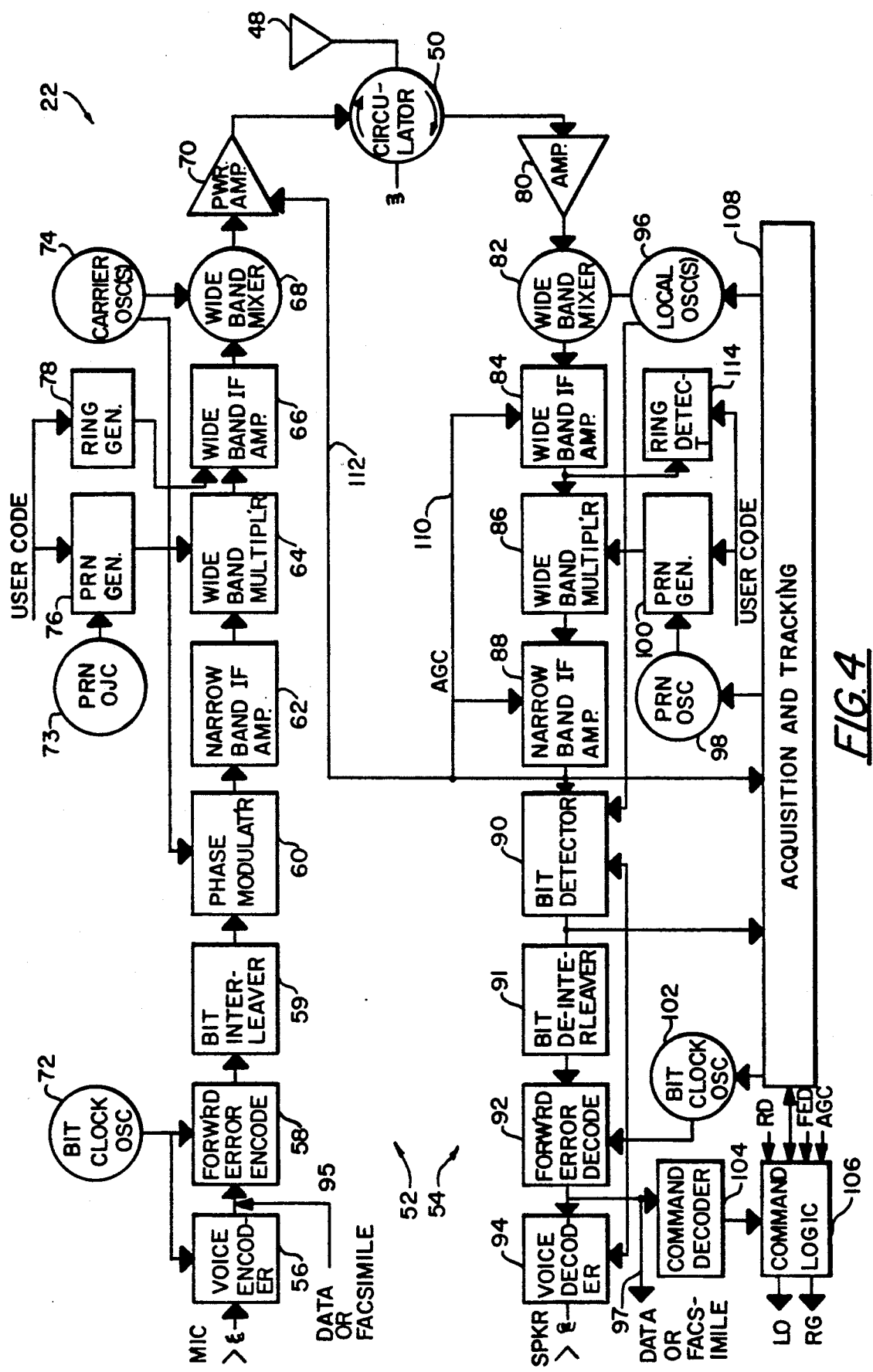
FIG. 4 is a functional block diagram of a user transceiver.

Referring now to FIG. 4, a functional block diagram of a typical user unit 22 is shown. The user unit 22 comprises a small, light-weight, low-cost, mobile transceiver handset with a small, non-directional antenna 48. The single antenna 48 provides both transmit and receive functions by the use of a circulator 50 or functionally equivalent relay switch or other means. It is fully portable and whether stationary or in motion, permits access to a wide range of communication services from one telephone with one call number. It is anticipated that user units will transmit and receive on frequencies in the 1-2 GHz band but can operate in other bands as well.

The user unit 22 shown in FIG. 4 comprises a transmitter section 52 and a receiver section 54. For the transmission of voice communication, a microphone couples the voice signal to a voice encoder 56 which performs analog to digital encoding using one of the various modern speech coding technologies well known to those skilled in the art. The resulting digital bit stream proceeds sequentially through forward error encoder 58, bit interleaver 59, phase modulator 60, narrow band IF amplifier 62, wideband multiplier or spreader 64, wide band IF amplifier 66, wide band mixer 68, and final power amplifier 70. Oscillators or equivalent synthesizers derive the bit frequency 72, pseudo-random noise or "chip" frequency 73, and carrier frequency 74. The PRN generator 76 comprises deterministic logic generating a pseudo-random digital bit stream capable of being replicated at the remote receiver. The ring generator 78 generates a short pseudo-random sequence.

The transceiver receive function 54 demodulation operations mirror the corresponding transmit modulation functions in the transmitter section 52. The signal is received by the non-directional antenna 48 and conducted to the circulator 50. An amplifier 80 amplifies the received signal for mixing to an IF at mixer 82. The IF signal is amplified 84 and multiplied or despread 86 and then IF amplified 88 again. The IF signal then is conducted to a bit detector 90 which decides the polarity of each channel bit, a bit de-interleaver 91 and then to a forward error decoder 92. Finally a voice decoder 94 performs digital to analog converting and results in a voice signal for communication to the user by a speaker or other means. Local oscillator 96 provides the first mixer 82 LO and the bit detector 90 timing. A PRN oscillator 98 and PRN generator 100 provide the deterministic logic of the spread signal for despreading purposes. The bit clock oscillator 102 drives the bit in the bit detector 90, forward error decoder 92 and the voice decoder 94.

The bit interleaver 59 and de-interleaver 91 provide a type of coded time diversity reception which provides an effective power gain against multipath fading to be expected for mobile users. Its function is to spread or diffuse the effect of short bursts of channel bit errors so that they can more readily be corrected by the error correction code.

As an alternative mode of operation, provision is made for direct data or facsimile input 95 to the transmitter chain and output 97 from the receiver chain. This direct data input and output feature may be used for facsimile communication for example.

A command decoder 104 and command logic element 106 are coupled to the forward error decoder 92 for receiving commands or information. By means of special coding techniques known to those skilled in the art, the non-voice signal output at the forward error decoder 92 may be ignored by the voice decoder 94 but used by the command decoder 104.

As shown, acquisition, control and tracking circuitry 108 are provided in the receiver section 54 for the three functional oscillators 96, 98, 102 to acquire and track the phase of their counterpart oscillators in the received signal. Means for so doing are well known to those skilled in the art.

Automatic gain control 110 is provided on the receive side 54, and the control signal is additionally utilized to provide open loop transmitter output power level control 112 of the transmit power amplifier 70. By virtue of reciprocity of the outbound and inbound paths, introducing the same attenuation control in the transmitter insures that all user signals arrive at the node (satellite or ground) at approximately equal amplitude in order that nearby users do not create an intolerably strong in-band interference signal and thereby preclude receiving weaker, more distant users.

An arrangement is provided for generating call requests and detecting ring signals. A ring generator 78 generates a ring signal based on the user's code for calling out with the user unit 22. For receiving a call, the ring signal is detected in a fixed matched filter 114 matched to a short pulse sequence which carries the user's unique code. By this means each user can be selectively called. As an option, the ring detect and call request signals may be utilized in poll/response mode to provide tracking information on each active user. Course tracking information, adequate for management of the call routing functions is provided by comparison of signal quality as received at various modes. For the precision location option, the user response signal time is accurately locked to the time of receipt of the polling signal, to a fraction of a PRN chip width. Measurement of the round trip poll/response time from two or more nodes or time differences of arrival at several nodes provides the basic measurement that enable solution and provision of precise user position. Ground and satellite transmitters and receivers duplicate the functions summarized above for the user units.

The command logic 106 is further coupled to the receiver AGC 110, the matched filter ring detector (RD) 114, the acquisition and tracking circuitry 108, the transmit local oscillator (LO) 96 and the ring generator (RG) 78 to command various modes of operation.

The economic feasibility of a mobile telephone system is related to the number of users that can be supported. Two significant limits on the number of users supported are bandwidth utilization efficiency and power efficiency. In regard to bandwidth utilization efficiency, in either the ground based cellular or mobile satellite elements, radio frequency spectrum allocation is a severely limited commodity. Measures incorporated in the invention to maximize bandwidth utilization efficiency include the use of code division multiple access (CDMA) technology which provides an important spectral utilization efficiency gain and higher spatial frequency reuse factor made possible by the use of smaller satellite antenna beams. In regard to power efficiency, which is a major factor for the satellite-mobile links, the satellite transmitter source power per user is minimized by the use of forward-error-correcting coding, which in turn is enabled by the above use of spread spectrum code division multiple access (SS/CDMA) technology and by the use of relatively high antenna gain on the satellite. CDMA and forward-error-correction coding are known to those skilled in the art and no further details are given here.

The issue of band width utilization efficiency will now be considered in detail. The major contribution of SS/CDMA to spectral efficiency is closely related to the concept of cellular "cluster". In existing Frequency Division or Time division multiple access technology, a given frequency or time slot allocation must be protected from interference from nearby cells by users on the same frequency sub-band. Depending on the degree of protection required, it may be necessary to preclude the reuse of the cell "X" frequencies on a number of cells, N, surrounding "X". That number is called the "cluster size". Because each cell can then utilize only one Nth of the total allocatable channels, it will be seen, all other things being equal, that the "frequency reuse factor" and spectral utilization efficiency are inversely proportional to the cluster size, N.

Field tests of the FM-frequency division multiplex ground cellular system, Macdonald, V. H., *The Cellular Concept*, Bell Systems Technical Journal, p. 15, January 1979, determined that a signal-to-interference ratio of 17 dB or better is required for good to excellent quality to be perceived by most listeners. This, combined with propagation and fading studies, yielded the criterion that the separation between co-channel sites should be at least 6.0 times the maximum distance to a user within the cell using omni-directional antennas at the ground nodes. In order to achieve this separation, the cluster size must be at least N=12 cells per cluster. Thus one may use only 1/12 of the total allocatable capacity per cell.

In satellite service, the minimum cell size is inversely proportional to the satellite dish diameter. For a given maximum feasible dish diameter, the number of available channels is strictly limited by the cluster size. In the planned AMSC system, C. E. Agnew et al., *The AMSC Mobile Satellite System*, Proceedings of the Mobile Satellite Conference, NASA, JPL, May 1988, the effective cluster size is 5, and one may use only 1/5 or the total allocatable capacity per cell.

In a system in accordance with the invention, the cluster size is one. That is, each cell uses the same, full allocated frequency band. This is possible because of the strong interference rejection properties of spread spectrum code division multiple access technology (SS/CDMA). The effect of users in adjacent cells using the same band is qualitatively no different than that of other users in the same cell, so may be taken into account as an effective reduction in the number of users that can be tolerated within a cell. The cumulative effect of all such other-cell interferers may be calculated on the assumption of uniform density of users and a distance attenuation law appropriate to the case of ground propagation or satellite beam pattern. Doing so, we find the multiplying factor for the ratio of total interference to in-cell origin interference of 1.4 for ground propagation and 2.0 for the satellite system. This factor may be accounted for as a multiplier on the effective cluster size for the CDMA system. Thus, finally, it is believed that in comparison with other systems we find frequency reuse factor or bandwidth utilization efficiency factors inversely proportional to effective cluster size in the ratios:

0.71:0.5:0.2:0.08 for respectively the ground cellular component of the invention, satellite cellular component of the invention, the AMSC mobile satellite concept, and current ground cellular technology.

The second severely limited commodity in the satellite links is satellite prime power, a major component of the weight of a communication satellite and thereby a major factor in satellite cost. Generally in systems such as this, the down links to individual users are the largest power consumers and thus for a limited satellite source power, may provide the limiting factor on the number of users that can be served. Thus it is important to design the system for minimum required power per user. This requirement is addressed in the invention in three ways. In the invention the system envisages the use of the highest feasible satellite antenna gain. In one embodiment, power gain on the order of 45 dB and beamwidth of under one-degree are envisioned at L-band. This is accomplished by an antenna size of approximately 20 meters. Secondly, by virtue of the use of the spread spectrum technique, very low rate high gain coding is available without penalty in terms of increased bandwidth occupancy. Thirdly, the system utilizes channel bit interleaving/deinterleaving, a kind of coded time diversity to provide power gain against deep fading nulls. This makes it possible to operate at relatively low bit energy to noise density ratio, on the order of 3 dB. This in turn reflects in minimum satellite power requirements per user.

In addition to the above listed advantages, the Code Division Multiplex system has the following important advantages in the present system. Blank time when some of the channels are not in use reduces the average interference background. In other words, the system overloads and underloads gracefully. The system inherently provides flexibility of base band rates; as opposed to FDM systems, signals having different baseband rates can be multiplexed together on an ad-hoc basis without complex preplanned and restrictive sub-band allocation plans. Not all users need the same baseband rate. Satellite antenna sidelobe control problems are significantly reduced. The above mentioned numerical studies of out-of-cell interference factors show that secondary lobe responses may effectively be ignored. Co-code reassignment (that is reuse of the same spreading code) is feasible with just one beam separation. However, because there are effectively (i.e. including phasing as a means of providing independent codes) an unlimited number of channel codes, the requirements on space division are eased; there is no need to reuse the same channel access i.e., spreading code.

By virtue of the above discussed design factors the system in accordance with the invention provides a flexible capability of providing the following additional special services: high quality, high rate voice and data service; facsimile (the standard group 3 as well as the high speed group 4); two way messaging, i.e. data interchange between mobile terminals at variable rates; automatic position determination and reporting to within several hundred feet; paging rural residential telephone; and private wireless exchange.

It is anticipated that the satellite will utilize geostationary orbits but is not restricted to such. The invention permits operating in other orbits as well. The system network control center 12 is designed to normally make the choice of which satellite or ground node a user will communicate with. In another embodiment, as an option, the user can request his choice between satellite link or direct ground based link depending on which provides clearer communications at the time or request his choice based on other communication requirements.

While several particular forms of the invention have been illustrated and described, it will be apparent that various modifications can be made without departing from the spirit and scope of the invention. Accordingly, it is not intended that the invention be limited, except by the appended claims.

What is claimed is:

1. A cellular communications system comprising:

at least one space node having a multiple beam antenna positioned so to establish a first set of cells, each space node including means for transmitting and receiving different predetermined sets of code division multiple access coded, spread spectrum waveforms digitally modulated and incorporating forward error correction coding with the waveforms being located in a predetermined frequency band common to all space nodes;

at least one surface node positioned so to establish a second set of cells, each surface node including means for transmitting and receiving the predetermined sets of code division multiple access coded, spread spectrum waveforms in the predetermined frequency band;

a plurality of user units within the cells, each unit including means for communicating with said at least one space node and with said at least one surface node and being operatively responsive to a predetermined one of the sets of code division multiple access coded waveforms to thereby establish selective communication with at least one of the nodes; and a network controller operationally connected with said at least one space node and with said at least one surface node to selectively allocate communications with said user units among said space and surface nodes.

2. The cellular communications system of claim 1 further comprising position means for determining which cell a selected user unit is in and for indicating the location of the cell.

3. The cellular communications system of claim 1 further comprising position means for determining the position of a selected user unit by providing a selective polling signal to the user unit from two or more nodes, measuring the response times of the user unit to the polling signals, comparing the response times and determining the position of the user unit based on the comparison.

4. The cellular communications system of claim 1 wherein the user unit comprises level control means for adjusting the output power of the user unit such that the signal received from the user unit by a selected node is substantially equal to a reference level.

5. The cellular communications system of claim 4 wherein the level control means measures the signal received at the user unit from a selected node and compares the level of the received signal to a reference level and adjusts the output power of the user unit based on the comparison.

6. The cellular communications system of claim 1:
wherein the waveforms comprise segments of bits; and
further comprising interleaving means for time-spreading adjacent bits in each segment.

7. The cellular communications system of claim 1 wherein the user unit comprises a hand-held, portable transceiver having a substantially non-directional antenna for communicating with the nodes.

8. The cellular communications system of claim 7 wherein the network controller controls the user unit to communicate with the space node of the cell that the user unit is in or with the surface node of the cell it is in based on a predetermined allocation of communication resources.

9. The cellular communications system of claim 1 wherein the multi-beam antenna of the space node provides beams of relatively narrow beamwidth.

10. The cellular communications system of claim 1 wherein the network controller controls the user unit to communicate with the space node of the cell it is within or with the surface node of the cell it is within.

11. The cellular communications system of claim 10 wherein the network controller controls the user unit to communicate with the space node of the cell that the unit is in or with the surface node of the cell it is in based on the quality of the signal received from the user unit at each such node.

12. The cellular communications system of claim 10 wherein the network controller controls the user unit to communicate with the space node of the cell that the unit is in or with the surface node of the cell it is in based on the location of the party with which the user unit desires to communicate.

13. The cellular communications system of claim 1 wherein the predetermined frequency band is divided into a plurality of sub-bands and communications with each space node are conducted in a first sub-band and communicatuons with each surface node are conducted in a second sub-band.

14. The cellular communications system of claim 1 wherein the user is mobile and may move from cell to cell at random.

15. A cellular communications system comprising:
at least one space node having a multiple beam antenna positioned so to establish a first set of cells, each space node including means for transmitting and receiving different predetermined sets of code division multiple access coded, spread spectrum waveforms digitally modulated and incorporating forward error correction coding with the waveforms being located in a predetermined frequency band common to all space nodes;

at least one surface node positioned so to establish a second set of cells, each surface node including means for transmitting and receiving the predetermined sets of code division multiple access coded, spread spectrum waveforms in the predetermined frequency band;

a plurality of user units within the cells, each user unit comprising a hand-held, portable transceiver having a substantially non-directional antenna and including means for communicating with said at least one space node and with said at least one surface node and being operatively responsive to a predetermined one of the sets of code division multiple access coded waveforms to thereby establish selective communication with at least one of the nodes; and a network controller operationally connected with said at least one space node and with said at least one surface node to selectively allocate communications with said user units among said space and surface nodes.

16. The cellular communications system of claim 15 wherein each user unit comprises level control means for adjusting the output power of the user unit such that the signal received from the user unit by a selected node is substantially equal to a reference level.

17. A cellular communications system comprising:
at least one space node having a multiple beam antenna positioned so to establish a first set of cells, each space node including means for transmitting and receiving different predetermined sets of code division multiple access coded, spread spectrum waveforms digitally modulated and incorporating forward error correction coding in all cells with the waveforms being located in a predetermined frequency band common to all space nodes;

at least one surface node positioned so to establish a second set of cells, each surface node including means for transmitting and receiving the predetermined sets of code division multiple access coded, spread spectrum waveforms in the predetermined frequency band in all cells;

a plurality of user units within the cells, each user unit comprising a hand-held, portable transceiver having a substantially non-directional antenna and including means for communicating with at least one space node and with said at least one surface node and being operatively responsive to a predetermined one of the sets of code division multiple access coded waveforms to thereby establish selective communication with at least one of the nodes, each user unit comprising level control means for adjusting the output power of the user unit such that the signal received from the user unit by a selected node is substantially equal to a reference level; and a network controller operationally connected with said at least one space node and with said at least one surface node to selectively allocate communications with said user units among said space and surface nodes.

18. The cellular communications system of claim 17 further comprising position means for determining which cell a selected user unit is in and for indicating the location of the cell.

19. The cellular communications system of claim 17 wherein the network controller controls the user unit to communicate with the space node of the cell that the unit is in or with the surface node of the cell it is in.

20. The cellular communications system of claim 17 wherein the user unit comprises means for indicating to the network controller the user-preferred node for communication.

* * * * *